UNITED STATES PATENT OFFICE 2,149,073

AZO DYESTUFFS

Hans Roos, Leverkusen-I. G. Werk, Germany, assignor to General Aniline Works, Inc., New York, N. Y., a corporation of Delaware No Drawing. Application November 7, 1935, Serial No. 48,775. In Germany November 30, 1934

5 Claims. (Cl. 260—159)

The present invention relates to new azo dyestuffs, more particularly it relates to azo dyestuffs which may be represented by the probable general formula

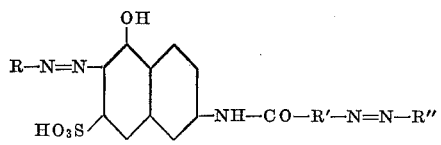

wherein R stands for the radical of a diazo compound suitable for preparing azo dyestuffs with the inclusion of a diazo azo compound, R' stands for a radical of the benzene series, and R" stands for a radical of a nondiazotizable yellow component of the group consisting of 1-aryl-5-pyrazolone-3-carboxylic acids and ortho-hydroxy carboxylic acids of the benzene series.

My new dyestuffs are obtainable by coupling any diazo compound or diazo azo compound with a 2-aminobenzoylamino-5-naphthol-7-sulfonic acid, further diazotizing and coupling with a 1-aryl-5-pyrazolone-3-carboxylic acid or an ortho-hydroxy carboxylic acid of the benzene series, which yellow components may bear in the aryl nucleus substituents, such as halogen, alkyl, the carboxylic acid group, the sulfonic acid group, there being excluded, however, the amino group.

My new dyestuffs are, in form of their alkali metal salts, generally red to brown powders, dyeing the vegetable fiber generally bluish red to brown shades, which can be discharged to a pure white both in a neutral as well as in an alkaline reacting medium.

The invention is illustrated by the following examples, without, however, being restricted thereto:

*Example 1.*—9.3 parts by weight of aniline are diazotized in the known manner and coupled with a solution alkaline with sodium carbonate of 36.5 parts by weight of 2-meta-amino-benzoyl-amino-5-naphthol-7-sulfonic acid. The dyestuff formed is filtered off with suction, stirred into a paste as finely as possible, and diazotized, at room temperature, by stirring for an hour with nitrite and hydrochloric acid. Then the diazotization mixture is stirred into a solution alkaline with sodium carbonate of 20.5 parts by weight of 1-phenyl-5-pyrazolone-3-carboxylic acid. The coupling is soon complete, and the dyestuff is isolated in the known manner. It dyes cotton very clear orange shades, which can be discharged to a pure white both in a neutral as well as in an alkaline reacting medium.

The dyestuff obtained in this manner corresponds to the following formula:

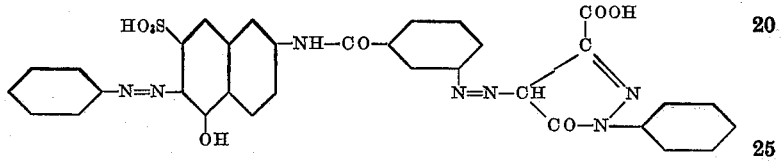

*Example 2.*—10.7 parts by weight of ortho-toluidine are diazotized in the known manner and coupled with a solution alkaline with sodium carbonate of 36.5 parts by weight of 2-para-amino-benzoylamino-5-naphthol-7-sulfonic acid. For the rest, the procedure is the same as described in Example 1, and a dyestuff dyeing somewhat more reddish shades than the dyestuff of Example 1, but exerting otherwise similar properties is obtained, which can be discharged to a pure white both in a neutral as well as in an alkaline reacting medium.

The dyestuff obtained in this manner corresponds to the following formula:

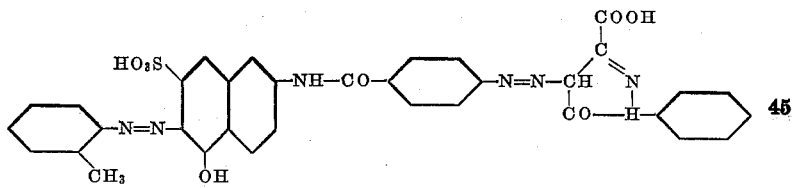

*Example 3.*—27.7 parts by weight of 4'-amino-azobenzene-4-sulfonic acid are diazotized and coupled, in a solution acid with acetic acid, in the known manner, with 36.5 parts by weight of 2-para-aminobenzoylamino-5-naphthol-7-sulfonic acid. By suspending with water, the dyestuff purified by previous isolation is finely dispersed and diazotized with an excess of nitrite and hydrochloric acid. Then it is coupled, in a solution alkaline with sodium carbonate, with 22 parts by weight of 1-phenyl-5-pyrazolone-3-carboxylic acid. The dyestuff obtained dyes the vegetable fiber bluish red shades, which are dischargeable to a pure white both in a neutral as well as in an alkaline reacting medium.

The dyestuff obtained in this manner corresponds to the following formula:

[Structural formula]

When substituting the aminoazobenzene monosulfonic acid by an equivalent quantity of the amino azodyestuff from diazotized 2-naphthylamino-4,8-disulfonic acid and meta-toluidine and working otherwise according to the directions given in paragraph 1 of the example, there is obtained a dyestuff yielding somewhat more bluish shades, which also can be discharged to a pure white both in a neutral as well as in an alkaline reacting medium.

*Example 4.*—13.6 parts by weight of diazotized monoformylmetaphenylene diamine are coupled, as indicated in Example 1, with 36.5 parts by weight of 2-para-aminobenzoylanino-5-naphthol-7-sulfonic acid and finally, likewise as indicated in Example 1, with 20.5 parts by weight of the methyl ester of 1-phenyl-5-pyrazolone-3-carboxylic acid. After having been isolated, the dyestuff is boiled for ½ hour in a suspension of sulfuric acid of 5% strength. Thus a dyestuff is obtained which dyes cotton scarlet red shades and which can be developed on the fiber in the known manner with beta-naphthol to a well dischargeable scarlet which is fast to washing. By developing with diazotized bases, such as for instance para-nitraniline and similar ones, reddish brown shades are obtained, which can be discharged to a pure white both in a neutral as well as in an alkaline reacting medium.

The dyestuff obtained in this manner corresponds to the following formula:

[Structural formula]

*Example 5.*—9.3 parts by weight of aniline are diazotized in the known manner and coupled with 36.5 parts by weight of 2-(para-aminobenzoylamino)-5-naphthol-7-sulfonic acid. The dyestuff formed is filtered with suction and, after pasting, further diazotized, while stirring for several hours with nitrite and hydrochloric acid. This diazotization mixture is added to a concentrated aqueous solution of 14 parts by weight of salicylic acid, to which 20 parts by weight of an aqueous solution of caustic soda have been added. Coupling is complete rather quickly, and the dyestuff of the formula

[Structural formula]

is isolated in the known manner; it dyes cotton a yellowish red of good dischargeability both in a neutral as well as in an alkaline reacting medium.

When using in this example ortho-toluidine, ortho-anisidine or other bases of this kind, more bluish red dyestuffs of similar properties are obtained.

*Example 6.*—13.6 parts by weight of meta-aminoformanilide are diazotized in the usual manner with nitrite and hydrochloric acid. For the rest, the procedure is the same as described in Example 5 using, however, for the final coupling 15.5 parts by weight of ortho-cresotinic acid. After isolation the dyestuff is suspended in sulfuric acid of 5% strength and heated at boiling temperature for about ¼ hour. The dyestuff obtained in this manner, of the formula

[Structural formula]

can be diazotized and developed on the fiber in the known manner with diazotized para-nitraniline. In the latter case a brown of good dischargeability both in a neutral as well as in an alkaline reacting medium is obtained.

I claim:
1. Dyestuffs of the general formula

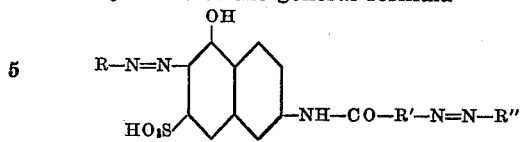

wherein R stands for a member selected from the group consisting of radicals having 1 or 2 benzene nuclei and azo compounds thereof, R' stands for a benzene nucleus, and R'' stands for a radical of a 1-aryl-5-pyrazolone-3-carboxylic acid, dyeing the vegetable fiber generally bluish red to brown shades, which can be discharged to a pure white both in a neutral as well as in an alkaline reacting medium.

2. Dyestuffs of the general formula

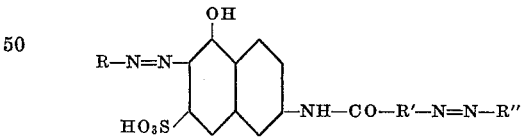

wherein R and R' stand for benzene nuclei, and R'' stands for a radical of 1-aryl-5-pyrazolone-3-carboxylic acid, dyeing the vegetable fiber generally bluish red to brown shades, which can be discharged to a pure white both in a neutral as well as in an alkaline reacting medium.

3. The dyestuff having in its free state the following formula:

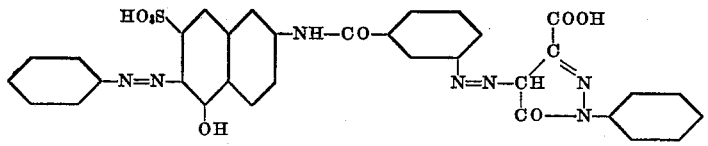

dyeing the vegetable fiber clear orange shades, which can be discharged to a pure white both in a neutral as well as in an alkaline reacting medium.

4. The dyestuff having in its free state the following formula:

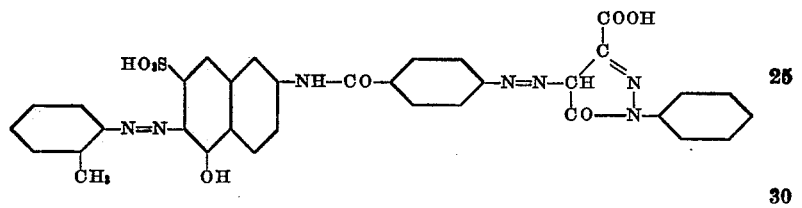

dyeing the vegetable fiber clear reddish orange shades, which can be discharged to a pure white both in a neutral as well as in an alkaline reacting medium.

5. The dyestuffs having in their free state the following formula:

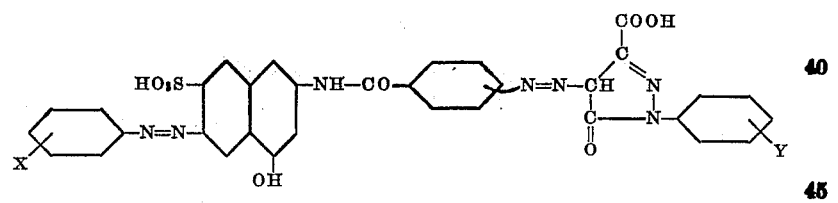

wherein X stands for a member of the group consisting of hydrogen, alkyl and amino and Y stands for a member of the group consisting of hydrogen, halogen, alkyl, the carboxylic acid group and the sulfonic acid group, dyeing the vegetable fiber clear orange to clear reddish orange shades which can be discharged to a pure white both in neutral as well as alkaline reacting medium.

HANS ROOS.